United States Patent Office 3,239,107
Patented Mar. 8, 1966

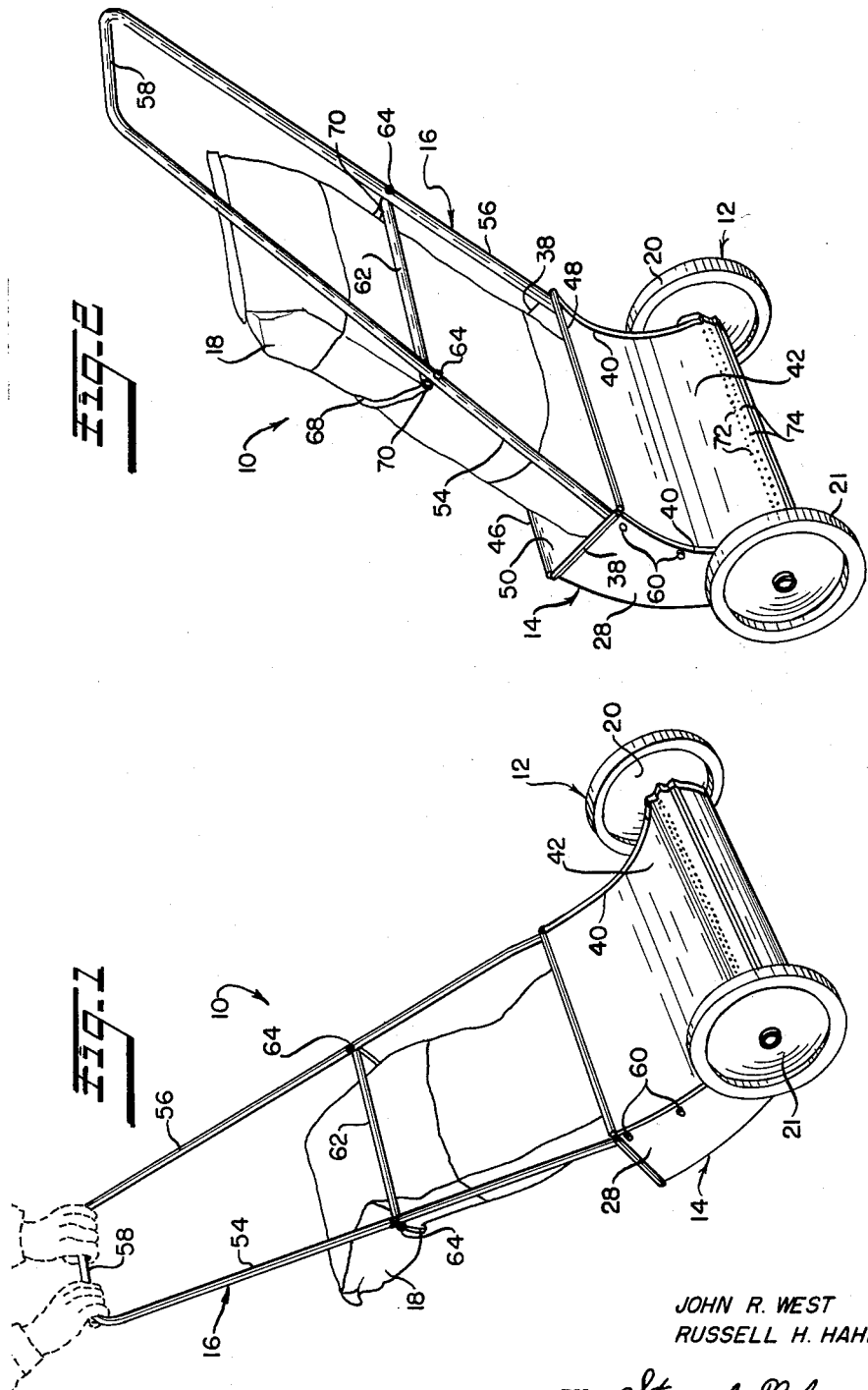

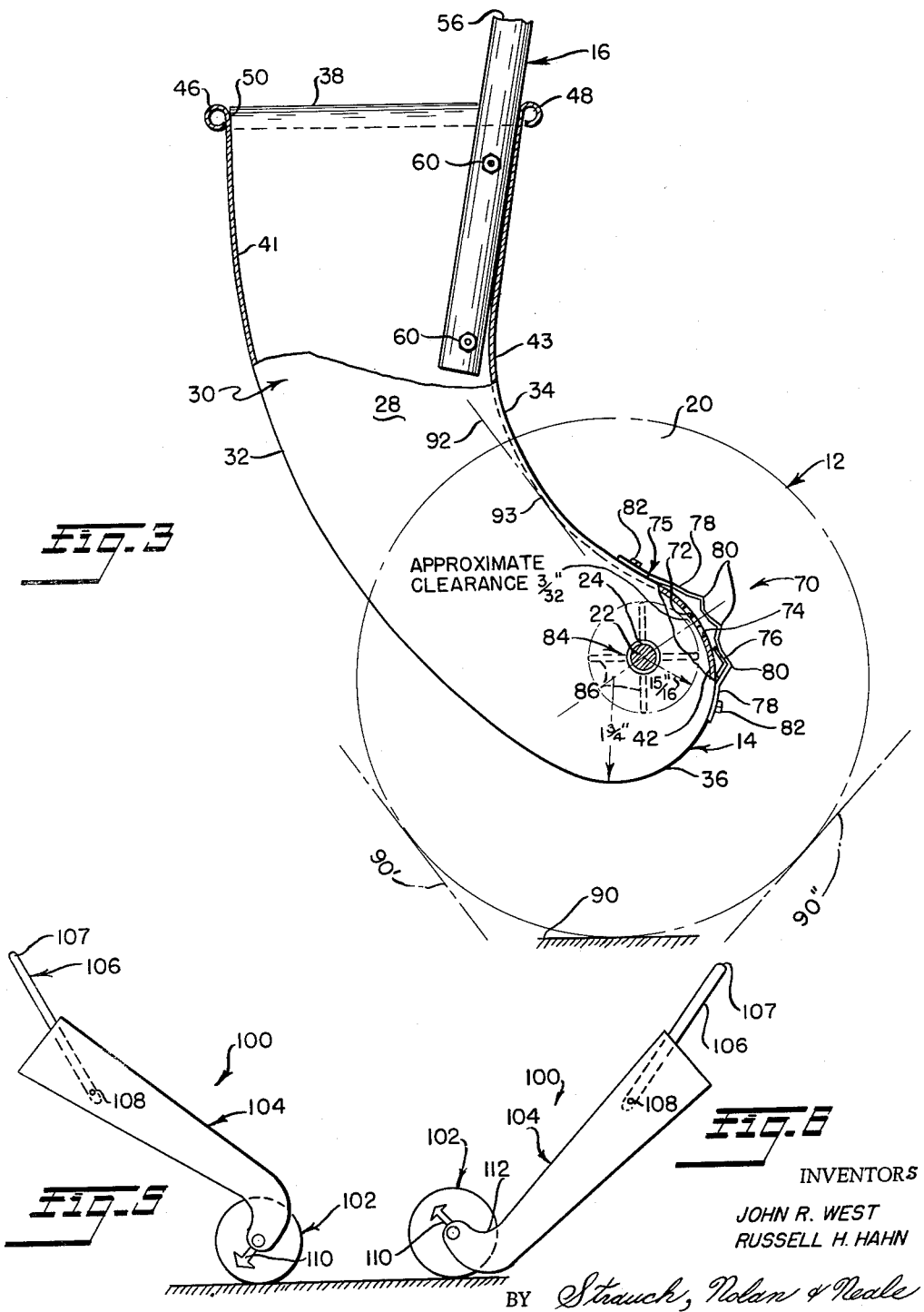

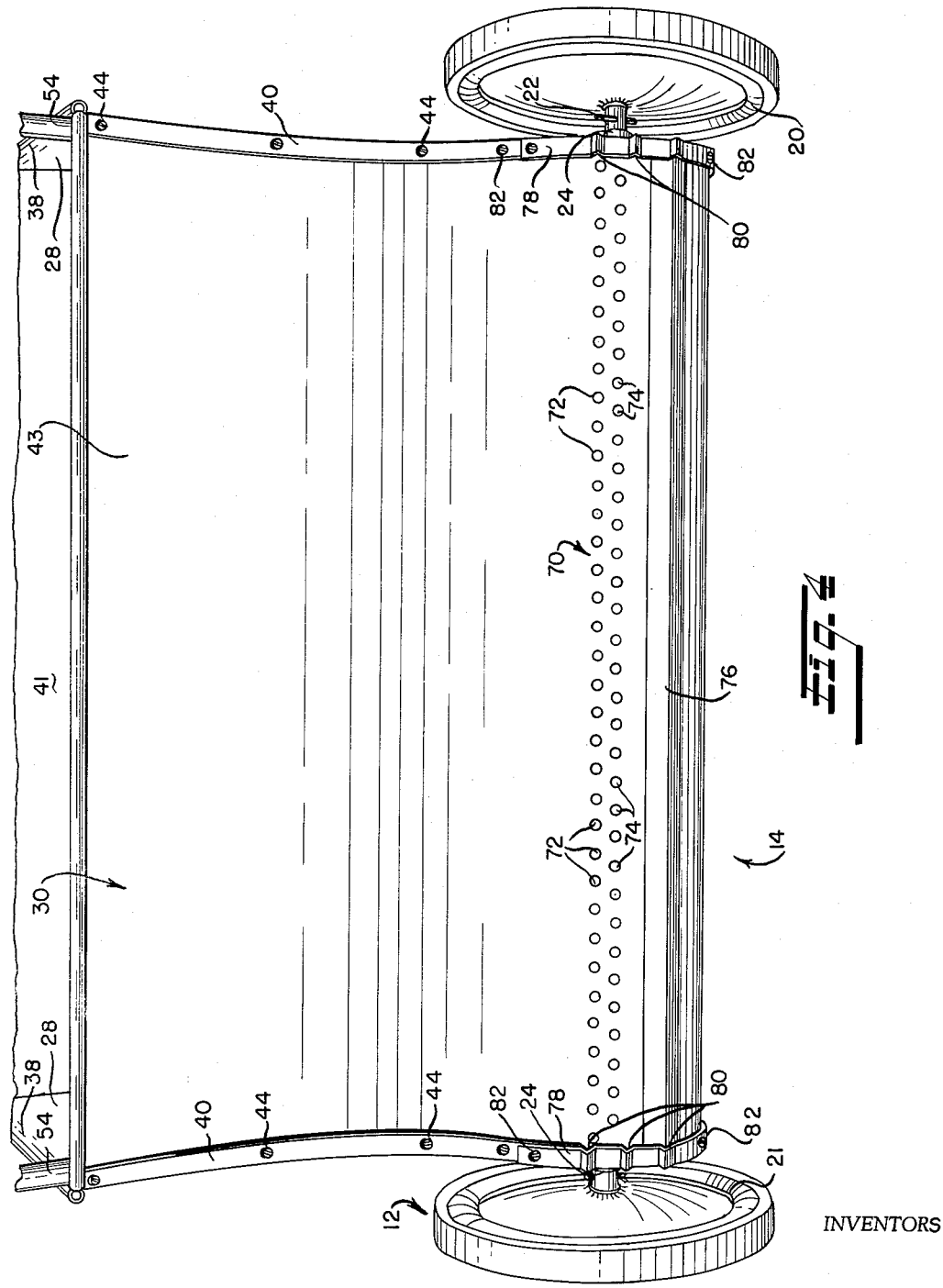

3,239,107
MATERIAL SPREADERS
John R. West and Russell H. Hahn, both of Marysville, Ohio, assignors to The O. M. Scott & Sons Company, Marysville, Ohio, a corporation of Ohio
Filed Dec. 4, 1963, Ser. No. 328,012
13 Claims. (Cl. 222—177)

The present invention relates to spreaders for surface distribution of lawn treatment materials such as seeds, fertilizers, herbicides, insecticides, and other plant treatment chemicals.

It is well known that lawn treatment materials can most effectively be applied to a lawn area by the use of a spreader to accurately and uniformly control the weight or volume quantity of material distributed per unit area of lawn. Because a spreader is customarily used for applying any of a variety of lawn treatment materials, as exemplarily enumerated above, spreaders are commonly provided with an indexed adjusting mechanism by which the area application rate may be selectively varied. As illustrated in many prior art United States patents, this mechanism may be a shuttered or closure plate the open position of which is adjustable to vary the size of discharge apertures in the spreader. A spreader of this previously known type is commonly equipped with a further mechanism to effect a complete shutoff of all of the apertures and hence to stop the discharge flow of material while the spreader is maneuvered in an area which does not require the lawn treatment material or which has been previously treated.

With the advance in the technology of lawn treatment in the last ten years, chemicals showing selective activity on plant tissue have been developed. These selectively active chemicals are usually effective only if accurately applied in a very narrow range of application rates. The easiest method of ensuring this accuracy of application rate is for the manufacturer to formulate a product having a predetermined percentage of active ingredient. The product or material is then sold to the homeowner or gardener with recommendations that a specific volume of the product, for example, the package-unit volume, be distributed over a specified number of square feet of lawn. To aid the purchaser, these recommendations are usually simplified so that the lawnowner merely has to set the adjustable rate mechanism of a spreader to a specified index number.

Because of the above described application accuracy required by modern lawn treatment materials, and because the various lawn treatment materials, exemplarily enumerated above, are distributed or spread at rates ranging from one-half to ten pounds per 1,000 square feet, spreaders designed and manufactured to perform these spreading functions have become increasingly more expensive and complex to meet the accuracy requirements throughout the wide range of application rates. Because the lawn maintainer depends on the index numbers of his spreader to obtain the proper application rate, it is necessary that each spreader assembly be identical with those previously produced so that it will, without fail, apply the desired amount of lawn treatment material. To achieve this end, very close tolerances of the components of the spreader assembly are required. The increased manufacturing cost necessitated by these close tolerances, the accompanying number of manufacturing rejects, and the additional expense of providing the adjustment and cutoff linkages, have all recently tended to unreasonably raise the cost of a spreader for the homeowner.

Accordingly, it is a primary object of the present invention to provide a low cost, simplified, improved spreader for accurate application of lawn treatment materials.

In accomplishing this object, it was determined that in a spreader according to the present invention having a rotating agitator adjacent fixed-sized hopper discharge apertures, a particular lawn treatment material composed of particles falling within a specified granular size and flowability range would flow through the fixed-sized discharge apertures in the hopper at a predetermined rate dependent upon the rate of agitation. This controlled discharge flow occurs because gravitational force of material in the hopper maintains the space between the agitator and the discharge apertures full of material so as to enable the force derived from rotation of the agitator to be transmitted to material immediately adjacent the discharge apertures to cause that material to flow from the hopper. By selecting apertures of only one fixed size, or at most a few fixed sizes (two sizes being shown in an illustrated embodiment), and by providing a laterally extending series of each size of apertures, it is possible to use a combination of the apertures in one or more of the series to provide the necessary range in rate of application as required by properly formulated herbicides, insecticides, and plant food materials. A simple, low cost closure plate positioned to close the unused apertures at the start of the spreading operation can provide the desired distribution rate without the need of any expensive and complex adjustment mechanism to accurately adjust variable-size openings. The fixed-sized discharge apertures of the present invention may be stamped by dies of predetermined size, and variances of less than one- or two-thousandths of an inch may be achieved to thereby obtain precise application-rate accuracy at a much lower cost than could be obtained in the prior art devices.

Inasmuch as the simplified, improved rate control mechanism of the present invention eliminates the previously-utilized, rate control mechanisms having sliding shutters to adjustably vary the size of and/or cutoff the discharge apertures, it is advantageous to utilize a novel, simplified, discharge cutoff system in the present invention. In the preferred embodiment, a manually-manipulatable wheeled spreader has discharge apertures placed in a curved or angular extension of the spreader hopper in such a manner that when the hopper of the spreader is swung to an inclined cutoff attitude forward of the spreader wheel axis, the material in the hopper extension falls away from the discharge apertures by gravity, leaving a void or empty space between the discharge apertures and the now uppermost portion of the agitator. In such a cutoff attitude, the particulate material in the spreader will not feed horizontally and/or upwardly to fill the space adjacent the discharge apertures under the reduced pressure head which exists due to material in the hopper, for reasons fully described hereinafter. The spreader can therefore be maneuvered in this cutoff attitude without dispensing or distributing material, and yet, as soon as the hopper is swung over to an inclined attitude to the rear of the spreader wheel axis, accurately controlled discharge will commence upon movement of the wheel-driven agitator within the hopper.

The novel cutoff system incorporated in the present invention necessitates a hopper that will retain lawn treatment material without spillage as the hopper is swung through a wide angle about the spreader wheel axis between the discharge and the cutoff attitudes. In the preferred embodiment, a relatively small hopper adjacent the wheels of the spreader accommodates an open end of an elongated packaging container, such as a bag or carton of the lawn treatment material. A spreader handle, which is connected to the hopper in the preferred embodiment, is provided with a mechanism to support and retain the bag or carton along the handle in proper position with respect to the hopper throughout the swinging motion of the spreader. The use of a relatively small hopper in conjunction with the material container to provide additional storage capacity, permits a light weight, inexpensive spreader construction which has a relatively thin side profile so as to be readily stored in a narrow space when not in use; for example, the present spreader can conveniently be hung relatively flat against a wall.

Accordingly, other objects of the present invention reside in:

(1) The provision of improved, simplified, distribution cutoff structures for wheeled lawn spreaders;

(2) The provision of improved, simplified application-rate-control mechanisms permitting greater tolerances and lower costs in the manufacture of lawn spreaders;

(3) The provision of improved, easily maneuverable lawn spreaders having hoppers substantially enclosing the lawn treatment material to prevent spillage and to prevent wind from blowing the material out of the hopper;

(4) The provision of improved, easily storable lawn spreaders;

(5) The provision of improved, light weight, inexpensive lawn spreaders wherein the packaging container of the lawn treatment material is utilized in conjunction with a relatively small hopper to increase the material storage capacity of the spreader and to facilitate the loading of material into the spreader;

(6) The provision of improved lawn spreaders having discharge apertures positioned so as to be protected from wind as well as from moist, damp grass and to be readily visible to the spreader operator so that proper dispensing from the discharge openings may be observed;

(7) The provision of improved lawn spreaders which are lighter, less bulky, and easier to maneuver than prior art structures; and (8) The provision of improved, easily maneuverable lawn spreaders having handled hoppers, elongated in width and height but shallow in longitudinal depth, to permit reverse inclination of the hopper of the spreader while still maintaining satisfactory storage capability of the hopper.

These and other objects of the present invention will become more fully apparent from the following description and appended claims when read in conjunction with the accompanying drawings wherein:

FIGURE 1 is a perspective view of a lawn spreader constructed in accordance with the present invention and shown in a cutoff attitude;

FIGURE 2 is a perspective view of the lawn spreader of FIGURE 1 shown in a discharge attitude;

FIGURE 3 is a partially sectioned side view of a lower portion of the spreader of FIGURE 1 shown in an upright maneuvering position, such as may advantageously be used in turning the spreader around at the end of one swath to start another dispensing swath in the opposite direction. This figure is derived from true scale engineering prints and shows exemplary dimension values for the hopper bottom and agitator radii and their correlated relationship with the discharge apertures;

FIGURE 4 is a rear view of a portion of the spreader of FIGURE 1;

FIGURE 5 is a side view of a lawn spreader, according to a modified embodiment of the present invention, shown in a discharged attitude; and FIGURE 6 is a side view of the lawn spreader of FIGURE 5 shown in a cutoff attitude.

As shown generally in FIGURES 1 and 2, a spreader 10, according to the present invention, incorporates a wheeled axle unit 12, a material discharging hopper unit 14 journalled on axle unit 12, and a manipulating handle unit 16 rigidly connected to hopper unit 14. Spreader 10 can be used with its hopper unit filled with material or (as shown) it can be used in combination with a package or bag 18 of lawn treatment material. The bag is positioned upside down and along handle unit 16 with its lower end open and extending into hopper unit 14 to permit material to flow from the bag to the hopper, from whence it is dispensed.

Shown in greater detail in FIGURES 3 and 4, wheeled axle unit 12 includes a pair of wheels 20 and 21 mounted on a transversely disposed axle 22 extending therebetween. At least one of wheels 20 and 21 is nonrotatably mounted on axle 22 so as to rotate axle 22 as the wheel rolls along the ground. Preferably, the other wheel is freely journalled upon axle 22 by a journal bearing enabling differential wheel rotation to enhance maneuverability of the spreader.

Hopper unit 14 is journalled upon axle 22 by a pair of bearings 24 each mounted on an associated side wall 28 of a material containing hopper 30. Side walls 28 are substantially flat, plate-like, sheet metal members having a curved elongated shape with a convex front peripheral edge 32 (FIGURE 3) joining a concave rear peripheral edge 34 by means of a smooth, convex, arcuate peripheral edge 36 at the bottom of hopper 30. The upper edge 38 of each side wall 28 is straight and preferably is in the form of an outwardly directed terminal roll of the side wall material. Substantially continuously along the three peripheral edges 32, 34, and 36, side walls 28 have inwardly directed integral transverse flanges 40 (FIGURE 4). The front, bottom, and rear walls 41, 42, and 43, respectively (FIGURE 3) of hopper 30 are preferably integrally formed from a single piece of sheet material shaped to conform to the curvatures of side walls 28. These integral walls are secured to the interior surfaces of side wall flanges 40 by any suitable means such as spot welding or sheet metal screws 44 as shown. The upper edges of front and rear hopper walls 41 and 43, are provided with outwardly directed strengthening and terminating rolls 46 and 48 which extend transversely between side wall terminal rolls 38 to form an upwardly directed hopper supply opening 50 (FIGURE 3).

As shown in FIGURES 1 and 2, handle unit 16 is formed from a generally U-shaped integral piece of tubing having legs 54 and 56 interconnected by transverse section 58 at their upper ends. The lower ends of handle legs 54 and 56 are rigidly connected to side walls 28 of hopper unit 14 as by bolt and nut assemblies 60 so that the handle unit extends upwardly, out from the hopper opening 50. A material-package-supporting crossbar 62 is secured transversely between handle legs 54 and 56 as by bolt and nut assemblies 64.

Handle unit 16 further includes a suitable device to retain bag 18 in operative position with respect to hopper unit 14 even when the spreader is in the cutoff attitude as shown in FIGURE 1. The device is preferably an elastic cord 68 connected at both ends to handle unit 16 adjacent the respective ends of crossbar 62 by suitable fixtures 70. One of the fixtures 70 may include releasable means such as a hook. Elastic cord 68 is resiliently stretched to the position most clearly shown in FIGURE 2 wherein it partially encircles bag 18 to urge the bag against the cross bar. The constrictive force of elastic cord 68 also prevents the bag from slipping up or down along handle unit 16.

Hopper unit 14 further includes a discharge mechanism 70 as shown in FIGURES 3 and 4. Discharge mechanism 70, in the illustrated embodiment, includes two transverse rows or series of apertures 72 and 74 respectively, apertures 72 being of a predetermined size larger than openings 74. These apertures may be punched in the sheet material of hopper wall 42 in a curved hopper extension section 75 (FIGURE 3) defined by the curved configuration of the hopper walls. In order to selectively close off certain of the punched apertures, a transverse bar 76 having a broad V-shaped section as shown in FIGURE 3 is provided to extend transversely across and thus close one or both or none of the two series of apertures in order to variably control the discharge rate from the hopper unit 14. It may be desirable to provide bar 76 with teeth (not shown) arranged to close only a part of the apertures, e.g., alternate ones, in any one row or several rows to provide intermediate discharge rates. Transverse bar 76 is selectively retained in position by two flexible, resilient detent bands 78 having preformed notch-like transverse bends 80, the bands being mounted at either side of discharge mechanism 70 to lie closely along the arcuate side wall flanges 40 adjacent the ends of the rows of apertures. Flexible bands 78 may preferably be retained in position on flanges 40 by sheet metal screws 82.

Discharge mechanism 70 further includes, within hopper 30, an agitator 84 (FIGURE 3) comprising, in the preferred embodiment, four generally rectangular flat blades 86 which are rigidly secured as by welding to extend transversely along axle 22 between side walls 28 at uniformly spaced circumferential positions around the axle.

Operation

To commence a material distribution operation with spreader 10 of the present invention, rate control bar 76 is manually adjusted under the resilient detent bands 78 so as to leave open only those apertures necessary to accomplish the desired rate of discharge of the specific particulate material to be distributed. Then a carton or a bag 18 of the lawn treatment material is opened at one end. Spreader 10 is placed flat on the ground with hopper opening 50 (FIGURE 2) on the top side of handle unit 16. Bag 18 is laid along handle unit 16 on top of crossbar 62 with the open end of the bag extending a substantial distance into hopper unit 14 through its upper opening 50. Elastic cord 58 is stretched between the opposite ends of crossbar 62 to secure the bag in place on the handle unit.

With bag 18 in position, spreader 10 may be swung up, about the wheel axis, from the loading position described above, through the vertical position illustrated in FIGURE 3 and over to the cutoff position of FIGURE 1. During this swinging motion through the vertical position, lawn treatment material will flow from bag 18 into the lower curved extension 75 of hopper unit 14, but it is unlikely that any will be discharged through the apertures 72 and 74 inasmuch as agitator 84 is not rotating at this time.

Hopper unit 14 will automatically stay filled up to the level of the open bottom of bag 18 as long as a supply of material remains in the bag. However, with the spreader in the position shown in FIGURE 1, it may be maneuvered to a spot where material distribution is to commence without distributing material inadvertently on the way because of the unique cutoff technique attained in the present invention. That is, as best shown in FIGURE 3, in the cutoff attitude the ground line would appear in relation to the structure of FIGURE 3 as the dot-dash line 90′. In this attitude it can be seen that discharge openings 72 and 74 are above a hoizontal line 92 which is tangent to the low point 93 of the concave rear wall 43 of the hopper. Due to the flow characteristics of particulate lawn treatment materials, and because of the limited pressure head from the bag and the supply side of the hopper, the material will not flow horizontally or upwardly to maintain a supply of material adjacent the discharge apertures. Therefore, even though agitator 84 is rotating, at least partially, in the mass of particulate material in the hopper, no material is discharged through the apertures.

When the spreader is in position to start material distribution, it is pivoted, or swung, about its wheeled axle through the vertical attitude to the discharge attitude of FIGURE 2. As indicated by the dot-dash ground line 9″ in FIGURE 3, which shows the ground to spreader relationship for the discharge attitude, particulate material may readily flow from the bag (not shown in FIGURE 3) to fill the discharge extention 75 of hopper unit 14. The downwardly directed pressure head of material in the hopper and the agitation by vanes 86, which move upwardly past apertures 72 and 74, cause a controlled gravity discharge of material through the apertures. In this discharge attitude, the discharge apertures are positioned rearwardly and upwardly from the low point of the spreader and are therefore prevented from clogging due to any moisture carried by the grass as it impinges on the front and lower portions of the curved hopper. Also, the rearward position of the discharge openings prevents relative air movement, as the spreader moves forward, from effecting the uniform distribution of material out from the apertures. Further, as shown in FIGURE 2, the discharge apertures 72 and 74 will be readily visible during the discharge operation so that the operator can visibly ascertain that material is being properly dispensed.

Upon completion of one swath with the spreader, it may be swung upwardly to its vertical attitude indicated in FIGURE 3 by the solid ground line 90. In this attitude, the discharge apertures are directed upwardly and will discharge only a minute amount of material while the spreader is pivoted about one wheel, while being maintained in the vertical attitude, until the spreader is aligned for a subsequent discharge swath across the lawn area.

Modification

As shown in FIGURES 5 and 6, a modified embodiment 100 of a spreader according to the present invention includes a wheeled axle unit 102, a material distributing hopper unit 104 journalled on the axle unit, and a handle unit 106 pivotally mounted at 108 within the hopper unit. The position and orientation of discharge openings (not shown) in hopper unit 104 are indicated schematically by arrows 110. The structure and operation of this embodiment are substantially similar to that described above for the embodiment of FIGURES 1 to 4 except as specifically described below. The limited pivotal arrangement at 108 between hopper unit 104 and handle unit 106 is provided to permit a greater angular rotation of the hopper unit in swinging from its discharge position of FIGURE 5 to its cutoff position of FIGURE 6 while miantaining handle portion 107 at a convenient height for the operator in both positions. This increased angular movement of the hopper unit may be found desirable with particularly flowable material in order to prevent inadvertant discharge in the shutoff position by lowering the point 112 (FIGURE 6) under which the material in the hopper must flow in order to feed up to the discharge openings in the cutoff attitude. This low point would be somewhat higher if a rigid handle were incorporated in this embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An attitude-cutoff material spreader comprising:
    (a) a transverse wheeled axle;
    (b) a hopper means operatively connected to said axle and adapted to be selectively disposed in a discharge attitude behind said axle and a cutoff attitude in front of said axle; and
    (c) material discharge apertures at a lower portion of said hopper means;
    (d) said hopper means including material-flow barrier means adjacent said apertures to prevent material flow under gravitational forces from said hopper means through said openings when the spreader is disposed in its cutoff attitude.

2. An attitude-cutoff material spreader comprising:
(a) a transverse, wheeled axle;
(b) a hopper means relatively elongated in its height dimension operatively connected to said axle and adapted to be selectively disposed in an inclined discharge attitude and an oppositely inclined cutoff attitude; and
(c) a hopper discharge means at the bottom portion of said hopper means and having material discharge apertures disposed in a portion thereof, at least said aperture portion of said discharge means being disposed higher than an immediately adjacent portion of said hopper means when the spreader is in its oppositely inclined cutoff attitude to permit material to fall away from said apertures to create an empty space immediately below said apertures and to prevent material flow under gravitational force into this space thereby effectively cutting off material discharge.

3. A spreader is defined in claim 2 together with a wheel-driven agitator comprising a portion of said discharge means to agitate material in said hopper means adjacent said discharge apertures.

4. An attitude-cutoff spreader for distributing material on a surface comprising:
(a) a transverse, spreader-supporting, wheeled axle;
(b) handle means mounted to freely swing in a vertical plane about said axle from a discharge attitude to the rear of the spreader to a cutoff attitude in front of the spreader;
(c) hopper means secured to said handle means to swing therewith and adapted to effectively retain material therein throughout the range of swinging movement of said handle means; and
(d) a material discharge mechanism associated with said hopper means to effect distribution of material when said handle means is in the discharge position and to automatically, gravitationally prevent material discharge when said handle means is swung to the cutoff attitude.

5. A spreader as defined in claim 4: said discharge mechanism including means to variably control the rate of material discharge.

6. A spreader as defined in claim 5: said variable control means comprising a plurality of apertures of predetermined sizes in said hopper and a closure member mounted on said hopper for selective positioning thereon to close selected combinations of said apertures.

7. A spreader as defined in claim 1 for distributing packaged material on a surface, wherein:
(a) an elongated, generally planar handle means is provided extending outwardly from said axle;
(b) said hopper means includes a relatively small, longitudinally thin, laterally elongated, material-distribution hopper unit connected to said handle means; and
(c) said spreader further comprises a generally flat, material-supply package mounted parallel to said handle means, said package having an open lower end fitting within said hopper unit to supply material for distribution during operation of said spreader, thereby increasing the effective spreader storage capacity while minimizing the overall size and the longitudinal depth of the spreader.

8. A spreader as defined in claim 7: said handle means including an elastic-cord mounting structure to resiliently retain the upper end of said supply package securely adjacent said handle means.

9. A material spreader as defined in claim 1 wherein,
(a) a transverse spreader-manipulating handle is spaced from said axle; and (b) said hopper means is relatively elongated in height and relatively shallow in longitudinal depth and is connected between said axle and said handle, said hopper means having a laterally elongated lower discharge end parallel to said axle and an upper supply-opening end adjacent said handle, said hopper means thereby permitting effective maneuverability of the spreader without hopper spillage through a substantial vertical angle of pivotal movement about said axle.

10. In an adjustable rate, material-distributing spreader having a transverse wheeled axle, a hopper adjacent said axle, and a spreader-manipulating handle, a material discharge mechanism comprising:
(a) a plurality of discharge apertures in a wall of said hopper, each aperture being a precise predetermined size, said apertures being arranged in transverse rows; and
(b) a closure mechanism connected to said hopper to be selectively positioned in any of a plurality of distinct positions wherein it closes selected apertures to variably control the rate of material distribution,
(c) said closure mechanism being a transverse bar adapted to selectively close apertures in said rows.

11. A combination as defined in claim 10: said transverse bar being resiliently retained in any of the selected distinct positions by a pair of resilient, notched straps mounted on said hopper and adapted to urge said bar against said hopper.

12. A material spreader comprising:
(a) a transverse wheeled axle;
(b) a relatively small material hopper operatively connected for swinging motion about said axle, said hopper having an upper material receiving opening;
(c) an elongated, generally planar handle means fixedly connected to said hopper to extend outwardly away from said axle, said handle means and said hopper being adapted to be selectively disposed in an inclined material discharge attitude to the rear of said axle and an inclined cutoff attitude in front of said axle;
(d) a gravitational-cutoff, hopper discharge section forming a bottom portion of said hopper and being disposed higher than an immediately adjacent portion of said hopper when the spreader is disposed in its cutoff attitude to thereby automatically cutoff gravitational material flow to said discharge section;
(e) a plurality of discharge apertures in a wall of said discharge section, each aperture being a precise predetermined size; and
(f) a closure mechanism connected to said discharge section to be selectively positioned in any of a plurality of distinct positions wherein it closes selected apertures to thereby effect variable control of the rate of material distribution;
(g) said handle means and said hopper being adapted to support an elongated, disposable, material-supply package along said handle with an open lower end of the package extending into said hopper opening to supply material to said hopper for distribution, the spreader thereby being adapted for swinging motion between the discharge and the cutoff attitudes without hopper spillage.

13. In combination in a material spreader having a main hopper means and a discharge agitator, an attitude-cutoff structure comprising:
(a) a hopper discharge section adjacent said agitator and in confined flow communication with said hopper means to receive material therefrom, said discharge section being adapted to be selectively disposed in a discharge attitude and a cutoff attitude;
(b) discharge apertures disposed in said discharge section adjacent said agitator; and (c) barrier means defining, when the discharge section is in its cutoff attitude, a downward extension of the upper portion of said hopper discharge section between said apertures and said hopper means to prevent gravitational material flow to a space between said agitator and said apertures to maintain a material level in said discharge section spaced below said discharge apertures thereby preventing discharge of material by action of said agitator.

References Cited by the Examiner

UNITED STATES PATENTS

| | | | |
|---|---|---|---|
| 1,390,383 | 9/1921 | Powell | 222—486 X |
| 2,200,773 | 5/1940 | Finne | 222—486 X |
| 3,107,822 | 10/1963 | Regenstein | 222—177 |
| 3,128,015 | 4/1964 | Wallis | 222—177 |

LOUIS J. DEMBO, *Primary Examiner.*

CHARLES R. CARTER, *Examiner.*